June 23, 1925.
F. G. W. BRISTOW
COMB AND FIXED CUTTER FOR SHEEP SHEARS
Filed June 4, 1923
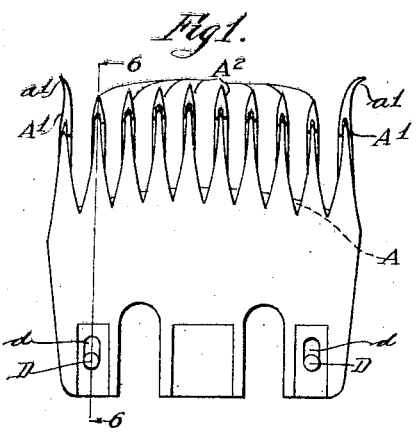
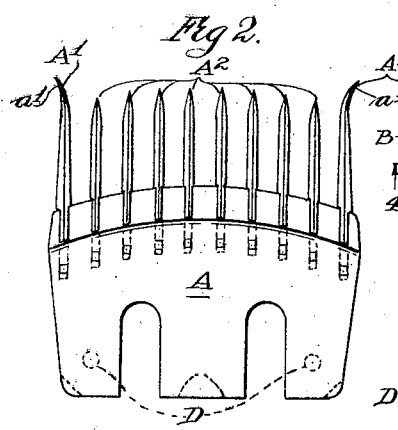
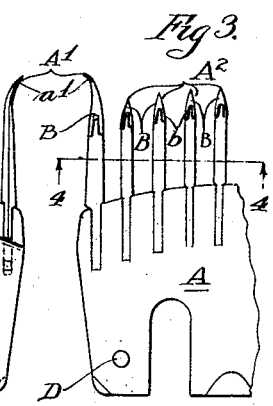
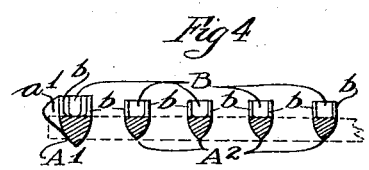
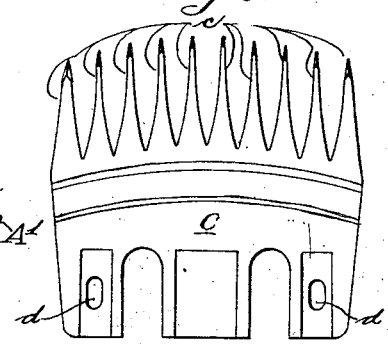

Patented June 23, 1925.

1,543,316

UNITED STATES PATENT OFFICE.

FRANCIS GEORGE WILLIAM BRISTOW, OF SYDNEY, AUSTRALIA, ASSIGNOR TO MICHAEL W. McARDLE, OF CHICAGO, ILLINOIS.

COMB AND FIXED CUTTER FOR SHEEP SHEARS.

Application filed June 4, 1923. Serial No. 643,157.

*To all whom it may concern:*

Be it known that I, FRANCIS GEORGE WILLIAM BRISTOW, a subject of the King of Great Britain, and a resident of Sydney, Australia, have invented certain new and useful Improvements in Comb and Fixed Cutters for Sheep Shears, of which the following is a specification, reference being had to the accompanying drawings, forming a part thereof.

The purpose of this invention is to provide an improved construction of the fixed comb and cutter of a power-operated sheep shear and the like which shall comprise a supporting plate and a separable blade having the shearing edges which require grinding, to the end that only such separable blade will require replacement by reason of being ground down to the limit of serviceability, the frequent renewal of the more expensive part of the fixed comb and cutter being thereby avoided. It consists in the elements and features of construction shown and described, as indicated in the claims.

In the drawings:

Figure 1 is a top plan view of a two-blade fixed comb and cutter embodying this invention.

Figure 2 is a bottom plan view of the supporting blade.

Figure 3 is a top plan view of a piece of the supporting blade, the cutting blade being removed.

Figure 4 is a section at the line, 4—4, on Figure 3.

Figure 5 is a top plan view of the cutting blade.

Figure 6 is a magnified detail section at the line, 6—6 on Figure 1.

Figure 7 is a magnified plan view of the terminal of one of the figures of the cutting blade.

Figure 8 is a section at the line 8—8 in Figure 7.

It is well understood that the fixed comb of a sheep shear of ordinary construction is one of the two shearing elements of the tool, each of the comb teeth or fingers being one of the jaws of the shear which comprises the co-operating tooth of the reciprocating cutter, the lateral edges of the teeth of the comb and of the corresponding teeth of the cutter co-operating in the shearing action. And it is well understood that the sharpening of the shearing edges is to be effected from time to time by grinding the entire contacting faces of the two co-operating shearing members. It is well understood also that repeated sharpening by thus grinding the contacting faces eventually reduces the parts in thickness so that they must be replaced by repair parts. With respect to the reciprocating cutter which is a simple flat blade of substantially uniform thickness, such as can be made as a die stamping from sheet metal subject only to finishing as to the edges, the waste involved in discarding when it becomes too thin for further service is negligible. But with respect to the fixed comb of which certain of the teeth or fingers are specially formed and all the teeth are specially formed on the under side by somewhat extensive milling processes, the waste involved in discarding is not so negligible; and the present invention aims to avoid this waste by making the fixed comb and cutter in two pieces, one of which, being the lower of the two blades, comprises all the specially formed and shaped parts of the teeth or fingers, while the upper blade having the shearing edges which require grinding has substantially none of the features which contribute chiefly to the cost of production.

The supporting member, A, of the comb has its extreme teeth, $A^1$, $A^1$, projected forward beyond the intermediate teeth, $A^2$, and curved outward as seen at $a^1$, for gathering the fibers of the wool into the range of the shearing action from a marginal area of the path traversed by the tool. All the comb teeth of this supporting member, A, are formed at their ends with upwardly projecting hoods, B, comprising lips, $b$, $b$, at the opposite sides of the tooth contiguous with each other around the point of the tooth as seen at $b^1$, and undercut as seen at $b^2$, (Figure 8).

The cutting blade, C, has its teeth, $c$, provided with shearing lateral edges, $c^1$, $c^1$, and pointed ends produced by beveling at the upper side on both the lateral converging edges, as seen at $c^2$, $c^2$, which by the intersection of these bevels, renders the tooth terminally beveled, as seen at $c^3$; and these pointed ends are intruded into the hoods, B, of the supporting member when the two blades are assembled in service as a complete comb. For holding the two blades in the relation described, the supporting blade has the upwardly projecting dowel studs, D, D, which engage correspondingly situated holes, d, d, in the cutting blade.

It will be understood that only the cutting blade requires grinding for sharpening and when by repeated grinding it becomes too thin for service, it alone is discarded and replaced by a repair blade, while the supporting blade continues serviceable substantially as long as the shearing tool of which it is a part.

I claim:—

1. A comb and fixed cutter for a sheep shear and the like, comprising a supporting blade and a cutting blade, the supporting blade having comb teeth provided at their points with guard lips projected up at both sides and the cutting plate seated flat on the supporting plate having teeth with shearing lateral edges and having terminal points entered between the guard lips of the corresponding teeth of the supporting plate, and means for engaging the two plates with each other against relative movement in the plane of their contact.

2. In the construction defined in claim 1, foregoing, the supporting plate having its extreme comb teeth at both ends extending forwardly beyond the length of the intermediate teeth of the comb and at their extended part curved outwardly for gathering into the comb fibers from marginal areas of the path traverse in shearing.

3. In the construction defined in claim 1 foregoing, the guard lips at the two sides of each of the comb teeth of the supporting blade being continuous with each other and thereby forming on each comb tooth a guard standing in front of the terminal point of the corresponding shear tooth of the cutting plate.

4. In a sheep shear and the like, a comb and fixed shear member consisting of a supporting and a cutting plate separably held together and stopped against relative displacement in the plane of contact, the supporting plate having the comb tooth each provided at the point with an up-raised lip forming a hood for guarding the terminal point of the corresponding tooth of the cutting plate, the cutting plate having its teeth corresponding respectively to the comb teeth of the supporting plate formed with lateral shear edges and with terminal points which enter the hoods of the comb teeth respectively of the supporting plate.

5. In the construction defined in claim 1 foregoing, the terminals of the shear teeth of the cutting plate being beveled laterally and at the end on the cutting side for rendering them substantially pointed.

6. In the construction defined in claim 4 foregoing the hoods of the comb teeth of the supporting plate being undercut and the terminals of the corresponding teeth of the cutting plate being intruded into the undercut cavity of the hood.

In testimony whereof, I have hereunto set my hand at Chicago, Illinois this 25th day of May, 1923.

FRANCIS GEORGE WILLIAM BRISTOW.